Oct. 1, 1957  A. R. GLIDDEN  2,808,024
FISH-BOWL HAVING REFLECTIVE SURFACES
Filed Feb. 9, 1954
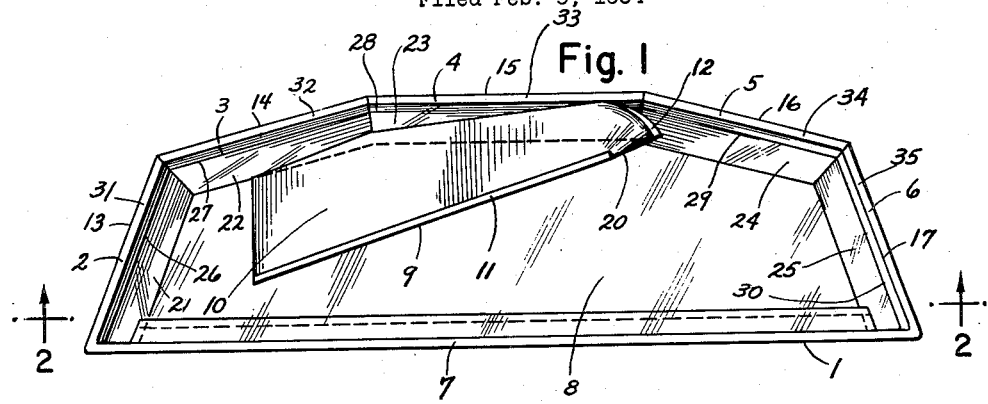
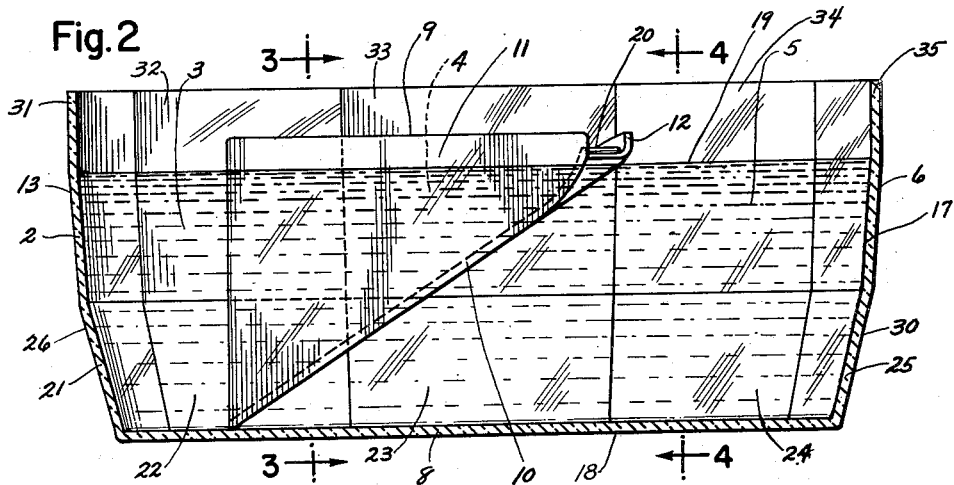
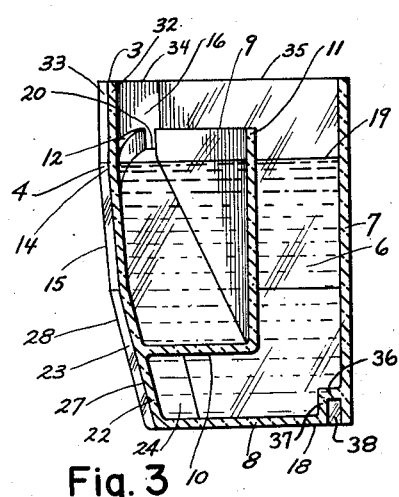
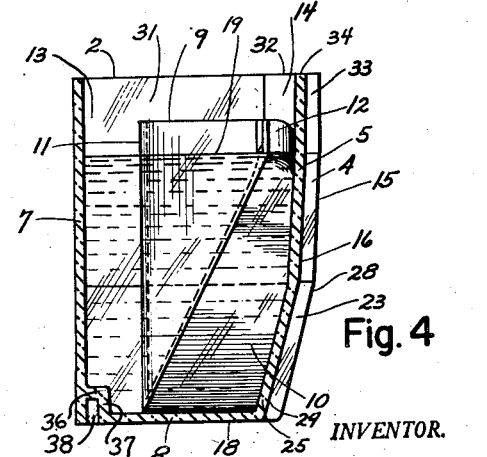
INVENTOR.
Arthur R. Glidden
BY

United States Patent Office 2,808,024
Patented Oct. 1, 1957

2,808,024
FISH-BOWL HAVING REFLECTIVE SURFACES
Arthur R. Glidden, Seattle, Wash.
Application February 9, 1954, Serial No. 409,151
2 Claims. (Cl. 119—5)

This application is concerned with a fish-bowl having a fish jump and a multiplicity of reflective surfaces on its sides and bottom to give the appearance of a large number of fish and also to induce the fish to sport and play more than they normally would.

It has been observed that fish like to swim with other fish and to form schools for traveling and sporting together; however, as it is not practical or desirable to have a large number of fish in fish-bowls of the size ordinarily found in homes and public places the fish do not have the opportunity to form schools. The appearance of a large number of fish can be achieved in a fish-bowl by having a multiplicity of sides formed with reflecting surfaces so that a fish within the bowl sees a reflection or reflections of himself and believes that he is in the presence of other fish. Also, the reflecting surfaces give the illusion of a large number of fish to the people observing them.

If there be a large fish and two or three small ones in the bowl then the large one at various times will chase the small ones into a channel-like fish jump and as they can go in only one direction they must swim to the edge of it and leap over.

An object of this invention is the making of an attractive fish-bowl having a multiplicity of reflective surfaces on its sides to present the appearance to both the contained fish and to an outside observer that the bowl contains more fish than are actually present.

Another object of this invention is the making of a fish-bowl with a fish jump extending from below the surface of the water to above the surface in order that fish contained in the bowl will jump out of the water.

Various other and ancillary objects and advantages of the invention will become apparent from the following description of an illustrative embodiment of the invention and explanation of the manner of its use.

In the accompanying drawing:

Figure 1 is a top plan view of a fish-bowl showing the fish jump and the reflective surfaces.

Figure 2 is a vertical cross-sectional view taken on line 2—2 of Figure 1.

Figure 3 is a vertical cross-sectional view taken on line 3—3 of Figure 2; and,

Figure 4 is a vertical cross-sectional view taken on line 4—4 of Figure 2.

Referring to the drawing it is seen that the invention comprises an elongated fish-bowl having a multiplicity of facet-like sides and back walls various parts of which are coated with a reflective material and provided interiorly with a fish jump 9. The front wall 7 and the bottom wall 8 are not coated and through the former of these walls the fish can be seen swimming and leaping from the fish-jump in the interior of the bowl. Along the bottom and front of the bowl is a recess 38 formed by the lower part of the front wall 7, wall 36 protruding horizontally from the back side of the front wall toward the center of the bowl, and vertical wall 37 extending from bottom wall 8 toward the interior of the fish-bowl and uniting with 36. This recess 38 is of such a size that a decal with decorations can be inserted and secured in it. The bowl has a number of flat smooth facets 2, 3, 4, 5, 6, 21, 22, 23, 24, and 25 located below the level of the water 19, and also has facets 31, 32, 33, 34, and 35 lying above such level. Each of such below-level facets is provided upon its exterior surface with a coating of reflective material 13, 14, 15, 16, 17, 26, 27, 28, 29, 30, while the facets lying above such a level may or may not have a reflective material. The reflecting surface reflects into the interior of the bowl and can be silver or aluminum applied to the outer surface of the above named sides in much the same manner as they are applied to a mirror.

The fish jump 9 is a channel-like structure which extends from below the water level to a diving edge elevated somewhat above such level and from which the fish can leap into the water. The fish-jump has a channel floor 10 which extends from the lower part of the bowl to a little above the water level with its lower part wider than the upper part, and the lower surface of the channel floor can be mirrored. Floor 10 has one edge integral with and extending more or less at right angles to facets 22, 23, 4 and 33 with that part near the water level bending up at approximately a right angle to form side 12 which curves inwardly and terminates flush with the straight exterior face 11 of the support. Such face 11 bends up at approximately a right angle to form a vertical triangular shaped side with its upper edge out of the water. This face is not a true triangle as it does not reach an apex near side 12 but at this part extends straight up permitting channel floor 10 to terminate in a diving lip 20. The fish swim into the channel-like structure, formed by floor 10, sides 11 and 12, and sides 22, 23, 4, and 33 of the bowl to the end of the support and leap over diving lip 20 into the water. The fish jump can be made of the same material as the fish bowl proper and fused to sides 22, 23, 4, and 33 of the fish bowl to make an integral unit.

The advantages of the invention, it is thought, have been clearly understood from the foregoing detailed description of the illustrated preferred embodiment. Minor changes will suggest themselves and may be resorted to without departing from the spirit of the invention, wherefore it is my intention that no limitations be implied and that the hereto annexed claims be given a scope fully commensurate with the broadest interpretation to which the employed language admits.

What I claim, is:

1. A fish-bowl having a floor and a multiplicity of sides some of which are provided with a reflective surface reflecting into the interior of the fish-bowl, and formed interiorly with a channel defined along the outside by one of said sides of the bowl, along the bottom by a horizontal wall extending from the last-named side of the bowl toward the interior of the bowl, and at the inside by a wall extending vertically upwardly from said horizontal wall, the lower limit of said channel being proximate to said floor of the fish-bowl, an opening being provided adjacent said bottom limit connecting the interior of the bowl with the interior of the channel.

2. A fish-bowl having a floor and a multiplicity of sides some of which are provided with a reflective surface reflecting into the interior of the fish-bowl, and formed interiorly with a channel defined along the outside by one of said sides of the bowl, along the bottom by a horizontal wall extending from the last-named side of the bowl toward the interior of the bowl, and at the inside by a wall extending vertically upwardly from said horizontal wall.

References Cited in the file of this patent

UNITED STATES PATENTS

| | | |
|---|---|---|
| D. 76,252 | McCreary | Sept. 4, 1928 |
| D. 86,325 | McCreary | Feb. 23, 1932 |
| 22,019 | Davis | Nov. 9, 1858 |
| 55,929 | Steck | Jan. 26, 1866 |
| 1,798,238 | Wass | Mar. 31, 1931 |